(12) United States Patent
Kawai

(10) Patent No.: US 9,941,526 B2
(45) Date of Patent: Apr. 10, 2018

(54) INERT GAS GENERATION FROM FUEL CELLS

(71) Applicant: The Boeing Company, Chicago, IL (US)

(72) Inventor: Ronald Tatsuji Kawai, Ranchos Palos Verdes, CA (US)

(73) Assignee: The Boeing Company, Chicago, IL (US)

(*) Notice: Subject to any disclaimer, the term of this patent is extended or adjusted under 35 U.S.C. 154(b) by 97 days.

(21) Appl. No.: 14/832,308

(22) Filed: Aug. 21, 2015

(65) Prior Publication Data
US 2017/0054163 A1 Feb. 23, 2017

(51) Int. Cl.
H01M 8/04 (2016.01)
H01M 8/04119 (2016.01)
H01M 8/04082 (2016.01)
H01M 8/04276 (2016.01)
H01M 8/04007 (2016.01)

(52) U.S. Cl.
CPC ... *H01M 8/04156* (2013.01); *H01M 8/04007* (2013.01); *H01M 8/04216* (2013.01); *H01M 8/04276* (2013.01)

(58) Field of Classification Search
CPC ............ H01M 8/04156; H01M 8/249
See application file for complete search history.

(56) References Cited

U.S. PATENT DOCUMENTS

| 2014/0023945 A1* | 1/2014 | Epstein | B64D 37/30 |
| | | | 429/415 |
| 2014/0087283 A1* | 3/2014 | Stolte | H01M 8/249 |
| | | | 429/435 |
| 2015/0344145 A1* | 12/2015 | Epstein | B64D 37/30 |
| | | | 244/135 C |

FOREIGN PATENT DOCUMENTS

WO WO2014105335 A1 * 7/2014

OTHER PUBLICATIONS

Srinivasan et al.; "Solid Oxide Fuel Cell APU Feasibility Study for a Long Range Commercial Aircraft Using UTC ITAPS Approace—vol. I: Aircraft Propulsion and Subsystems Integration Evaulation"; NASA/CR-2006; Dec. 2006; vol. 1; 40 pages.
Whyatt et al.; "Electrical Generation for More-Electric Aircraft using Solid Oxide Fuel Cells"; Pacific Northwest Nat'l Laboratory and U.S. Dept. of Energy; PNNL-21382; Apr. 2012; 110 pages.
Eelman et al.; "Fuel Cell APU's in Commercial Aircraft—An Assessment of SOFC and PEMFC Conceptes"; 24th Int'l Congress of the Aeronautical Sciences; 2004; 10 pages.

(Continued)

Primary Examiner — Olatunji Godo
(74) Attorney, Agent, or Firm — Gates & Cooper LLP

(57) ABSTRACT

A dual purpose fuel cell configuration generates electricity and oxygen-depleted inert gases. The inert gaseous outflows are then applied to fuel tanks comprising electric compartments, fuel tanks, battery compartments, storage cavities, and refrigeration containers. Due to the low oxygen concentration in the generated gas, applications for these inerted gases range from fire prevention, fire suppression, and fumigation, to preservation of perishables, refrigeration, food and beverage preparation, and oxidation prevention.

20 Claims, 7 Drawing Sheets

(56) References Cited

OTHER PUBLICATIONS

Kawai et al.; "Air Vehicle Integration and Technology Research (Aviatr)—Delivery Order 0033: Liquefiled Natural Gas (LNG) Legacy System Integration Study"; The Boeing Company; AFRL-RQ-WP-TR-2014-0108; May 2014; 55 pages.

"Cobham to Supply Boeing with On-Board Inert Gas Generating System Equipment for US Air Force KC-46 Tanker Programme"; Cobham; News Release; Aug. 2012; 3 pages.

"World Energy Outlook 2014"; Int'l Energy Agency; 2014; 15 pages.

* cited by examiner

INERT GAS GENERATION FROM FUEL CELLS

TECHNICAL FIELD

The disclosed invention relates generally to inert gas generation. More particularly, the disclosed embodiment relate to methods and systems for inert gas generation from fuel cells, and applications for the generated inert gases.

BACKGROUND

Technology advancements are rapidly improving efficiencies and reducing weights for electric power systems. Electric power in both surface and air vehicles has been increasing especially in military and commercial platforms. For example, electric power has replaced pneumatic systems in the Boeing 787, which was specifically designed to be a More Electric Airplane (MEA) with improved energy efficiency.

This trend towards increasing use of electric power systems motivates studies to further improve the efficiency of producing electric power generation in air vehicles with fuel cells. Fuel cells use electro-chemical reactions to produce electricity, waste water, and oxygen-depleted inert gases. Multiple studies have concluded that fuel cells have higher power generation efficiency, compared to jet fuel combustion, gas turbines, and internal combustion engines.

However, regarding aircraft flight fuel efficiency, the increased weight of a fuel cell results in more fuel burned during flight than a gas turbine. Although the weight increase may be partially offset by reducing water loading before flight and recovering fuel cell waste water, the weight penalty must be further reduced to make fuel cell usage more economically attractive.

This could potentially be accomplished by eliminating other aircraft systems that contribute a significant amount of weight. Aircrafts, especially military aircrafts (e.g. C-17A, KC-46A) and transport aircraft (e.g. Boeing 787), use On Board Inert Gas Generation systems (OBIGGS) or Nitrogen Enriched Air (NEA) systems for inerting tanks storing jet fuel. (See "Cobham to Supply Boeing with On-Board Inert Gas Generating System Equipment for US Air Force KC-46 Tanker Program", Cobham News Release, Ref #461, 1 Aug. 2012; and "Fuel-Tank Safety Comes Standard on New Boeing 787," copies of these documents are being submitted with an Information Disclosure Statement filed with the present application.). These systems pass air through a semi-permeable membrane to reduce oxygen content and incur a fuel consumption penalty because they use engine bleed air. Engine bleed air incurs a 1% Specific Fuel Consumption (SFC) penalty for each 1 lb./sec of bleed flow. Thus, eliminating the engine bleed for OBIGGS or NEA systems and the systems' weight would provide a large offset for the weight increase with a fuel cell. This disclosed invention also applies to fuel cells used in surface applications to generate where the inert gas can be for fire prevention, fire suppression, preservation of perishables, oxidation prevention, and fumigation.

SUMMARY

This summary is provided to introduce a selection of representative concepts in a simplified form that are further described below in the detailed description. This summary is not intended to identify key features or essential features of the claimed subject matter, nor is it intended to be used in any way that would limit the scope of the claimed subject matter.

A system for generating inert gas from fuel cells, in accordance with an illustrative embodiment of the present invention, comprises a dual purpose fuel cell to generate electricity and inert gas, a water tank to receive liquid byproducts, and an aircraft flight fuel tank with means for receiving and applying the generated inert gas. The fuel cell uses a hydrogen fuel source and an oxygen source to generate the electricity, liquid, and gaseous products.

In the illustrative embodiment, the generated inert gas is directed to fuel tanks, refrigeration containers, cargo containers, electric compartments, battery compartments, and storage cavities, where the gas can be further applied for purposes comprising fire prevention, fire suppression, fumigation, preservation of perishables, or prevention of oxidation reactions.

Other features of the illustrative embodiment are described below.

DETAILED DESCRIPTION OF ILLUSTRATIVE EMBODIMENTS

In the following description, specific details are set forth to provide a thorough understanding of various embodiments of the invention. However, one skilled in the art will understand that the invention may be practiced without these details.

Figure 1:
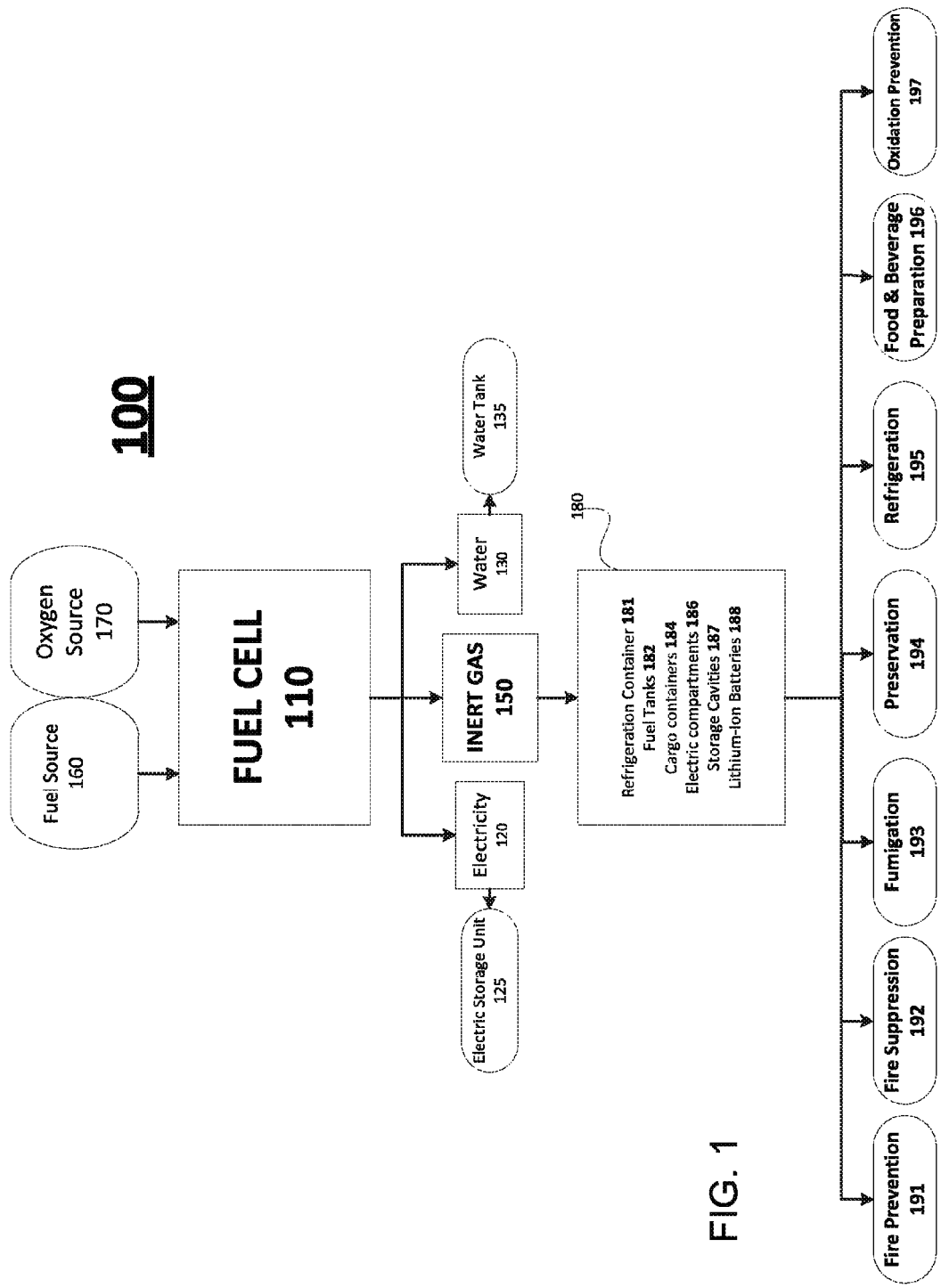
FIG. 1 is a block diagram illustrating a method to generate and further apply inert gas by using a fuel cell.

FIG. 1 illustrates an example method 100 for generating oxygen-depleted inert gas using a fuel cell, along with potential applications of the generated gas. (In the context of the present application, "inert gas" refers to a gas the oxygen content of which has been substantially depleted, i.e., so that the gas is substantially non-oxidizing and does not undergo chemical reactions under a set of given conditions. Accordingly, "inert gas" is not restricted to the noble gaseous elements, such as helium, neon, argon, krypton, xenon, and radon.) A fuel source 160 provides the hydrogen necessary for electricity and gas generation in a fuel cell 110. The fuel source 160 may be in the form of liquefied natural gas (LNG) 310, liquefied or compressed hydrogen 610, or a non-cryogenic hydrocarbon 410 (see FIGS. 3-7). An oxygen source 170 such as atmospheric air provides the oxygen for the fuel cell reaction.

The fuel cell 110 receives both the fuel source 160 and oxygen source 170, and combines those reactants to produce electricity 120, water 130, and inert gas 150. Generated electricity is then used for electric power or stored in an electric storage unit 125 and any liquid byproducts from the fuel cell reaction, such as water 130, are collected in a water tank 135 and can be further utilized in other applications.

The fuel cell reaction depletes oxygen from the incoming oxygen source 170, resulting in an inert gaseous outflow 150 mainly comprising carbon dioxide, nitrogen, and other oxidation products, depending on the fuel source 160. For example, a hydrocarbon fuel source 410 would result in inert gas comprising carbon dioxide, nitrogen, and small amounts of carbon monoxide and other constituents. Small concentrations of other oxygen containing compounds may also be present in the inert gas 150, but at levels too low to support combustion or rapid oxidation.

Therefore, the fuel cell generated inert gas 150 can be received in a gas or fuel tank 180 and used in other applications. In one embodiment, inert gas 150 can be collected in refrigeration containers 181 (see FIGS. 5-7 describing the cooling method), a fuel tank 182, cargo containers 184, and storage cavities 187 to aid in preservation 194, fumigation, and refrigeration 195, when storing perishables like fruits, vegetables, meats, and flowers. The gas may even be applied to assist in food and beverage preparation 196. Furthermore, applying the gas 150 to inert fuel tanks 182, electric compartments 186, and battery compartments (e.g. lithium-ion) 188 aids in fire prevention 191, fire suppression 192, fumigation 193, and oxidation prevention 197 (e.g. rust) since the oxygen-depleted gas is unable to support combustion, rapid oxidation, and explosions. Furthermore, the expression "to inert" refers to the act of generating or creating an "inert gas" as defined hereinabove.

Non-limiting exemplary embodiments and methods to accomplish the inert gas applications and benefits, among others, may be found in the following sources. A system and method to inert a gas tank, including a chiller controller, is disclosed in U.S. Pat. No. 7,918,358B2. This could be adapted for preservation, preparation, and other refrigeration applications for food, beverages, and other perishables. Inert gas distribution systems for fuel tanks and other compartments are disclosed in U.S. Pat. Nos. 8,789,794, 8,801,831B1, and 7,204,868B2. Furthermore, U.S. Patent 20100108811A1 discloses how to inert a tank using through fumigation-style methods. Fire suppression and fire prevention methods using inert gas are achieved in methods and systems like U.S. Pat. Nos. 8,733,463B2, and 7,597,288B2. Any of these methods and systems may be combined in whole or in part with others, and are not limited to only the described embodiments in accomplishing the inert gas applications.

U.S. Patent EP0628259A1 discloses an exemplary method to preserve perishable food using inert gases. Food and beverage preparation and cooking may be accomplished through such methods disclosed in U.S. Pat. No. 7,008,659B1, CA2428267A1, and U.S. Pat. No. 5,093,141A. U.S. Pat. No. 3,338,062A describes an absorption refrigeration method using inert gases. Fire suppression and protection systems and methods are disclosed in U.S. Patents WO2007079724 A3, CN201310227285 and CN201921356U. Several fumigation systems applying inert gases are disclosed in U.S. Patent CA2232485C, CA2085435C, and U.S. Pat. No. 4,889,708A. Additionally, U.S. Pat. DE3341513 A1 discloses one method to use inert gas for corrosion protection and preservation.

Figure 2:
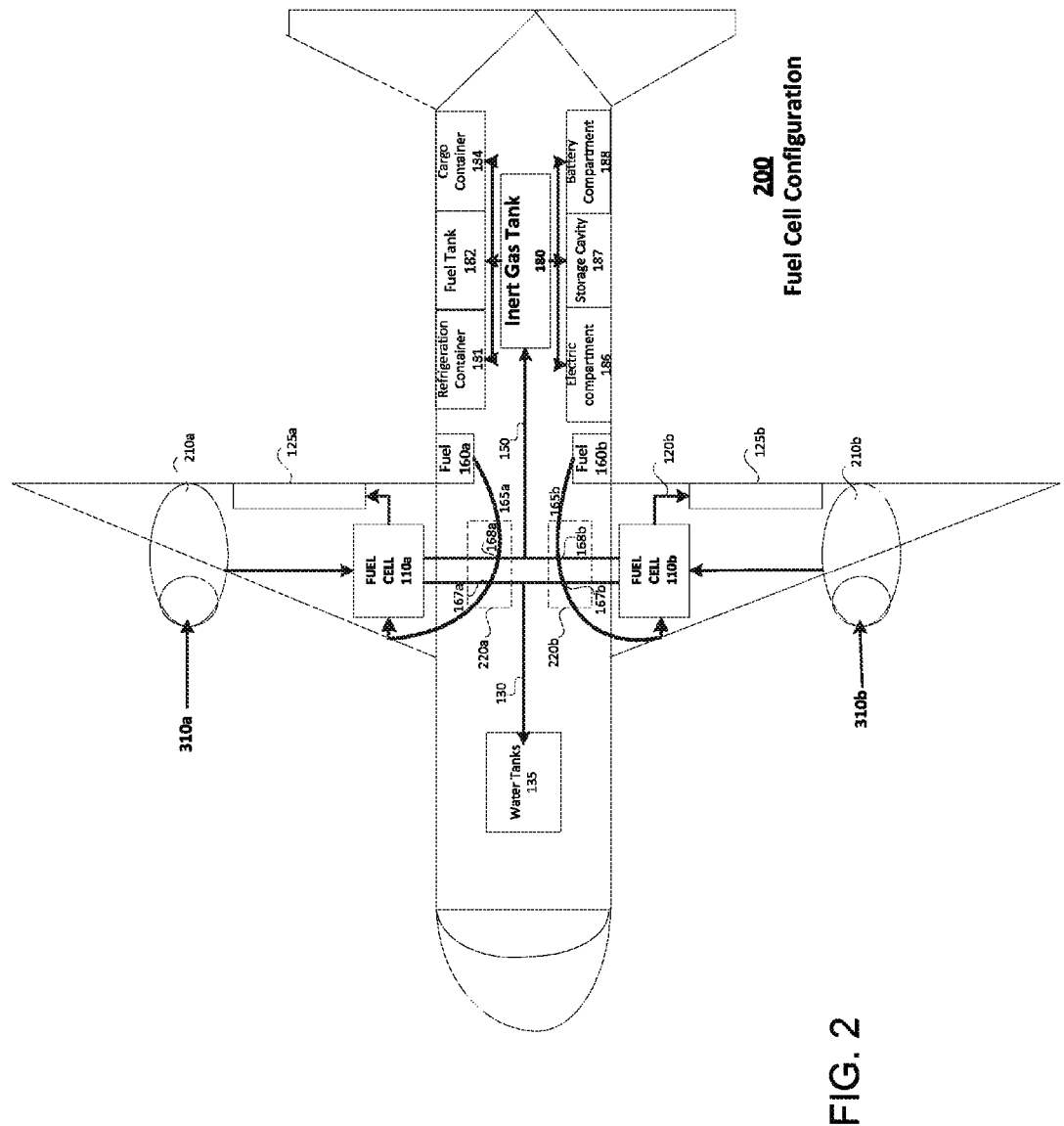
FIG. 2 is a diagram illustrating a fuel cell configuration to generate and apply inert gas within an aircraft.

FIG. 2 illustrates the fuel cell configuration within an aircraft. The designations a, b on the numbered references designate that parts are, respectively, located on the left wing and right wing of the aircraft. In this embodiment, atmospheric air 310 serves as the oxygen source. The air is passed through an air compressor 210 then delivered to the fuel cell. The hydrogen fuel source 160, situated on the aircraft, is also delivered to the fuel cell, where electricity 120, water 130, and inert gas 150 is produced.

Electricity is used for electric power or collected in a storage unit 125 and may be further applied to power other aircraft operations. The gaseous and water outflows may be applied to heat exchangers 220 to vaporize the fuel source 160, if necessary, in preparation for use in the fuel cell 165. (See FIG. 3 describing vaporization of LNG when used as a fuel source). The water outflow is delivered to water tanks 135, and the inert gas delivered to inert a gas tank 180. The gas tank 180 may be at least one of the several embodiments described in FIG. 1.

Figure 3:
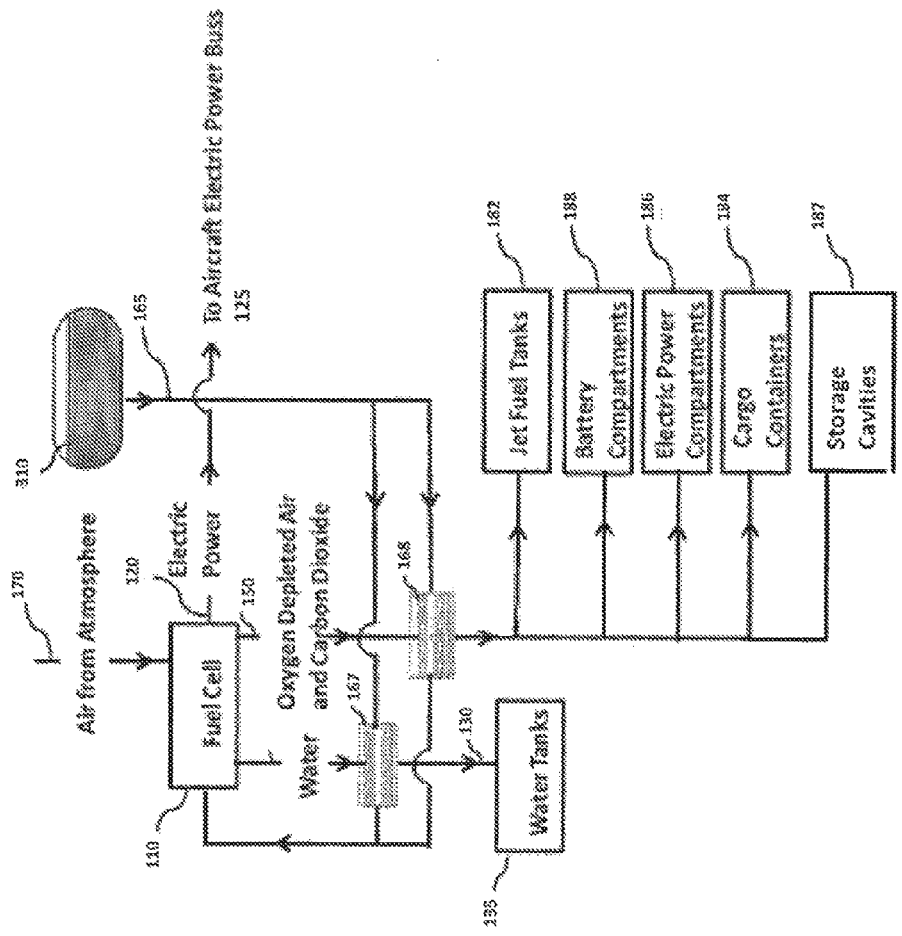
FIG. 3 is a flow diagram illustrating a fuel cell configuration using liquefied natural gas to generate and further apply inert gas.

FIG. 3 illustrates a variation of the fuel cell configuration, but liquefied natural gas is used as the fuel source 160. Compared to jet fuel, LNG weighs less and is more efficient in fuel cells. The 4:1 hydrogen to carbon ratio of LNG improves fuel weight specific fuel consumption and can eliminate the need for a separate reformer to produce hydrogen for fuel cell consumption. A LNG system provides an energy cost reduction, efficiency improvement, weight reduction, and simplification benefits that would make fuel cell use more attractive in dual LNG/JP fueled aircraft.

In such a system, LNG fuel 310 is stored in a tank that may be the main engine tanks or a separate dedicated tank for the fuel cell. LNG fuel 310 is passed through heat exchangers 220 that vaporize the LNG from heat in the water outflow 167 and/or heat from the gaseous outflows 168. The vaporization may be limited to just heat exchangers 220 from the gaseous outflows 168, if necessary to avoid freezing the fuel cell water outflow 130.

The LNG flow is then fed into the fuel cell 110 with an oxygen source 170 such as atmospheric air to produce electric power 120. The atmospheric air could be ambient, from a pressurized cockpit, or from an aircraft payload bay source. The fuel cell ionizes the fuel source, and then allows for interaction with the oxygen source to generate electricity 120, water 130, and inert gases 150. The generated electricity is delivered to an electric power storage unit 125, and the water 130 is pumped to water storage tanks 135. The generated inert gases 150 are received to inert gas tanks comprising fuel tanks 182, batteries 188, electric compartments 186, cargo containers 184, and storage cavities 187.

Figure 4:
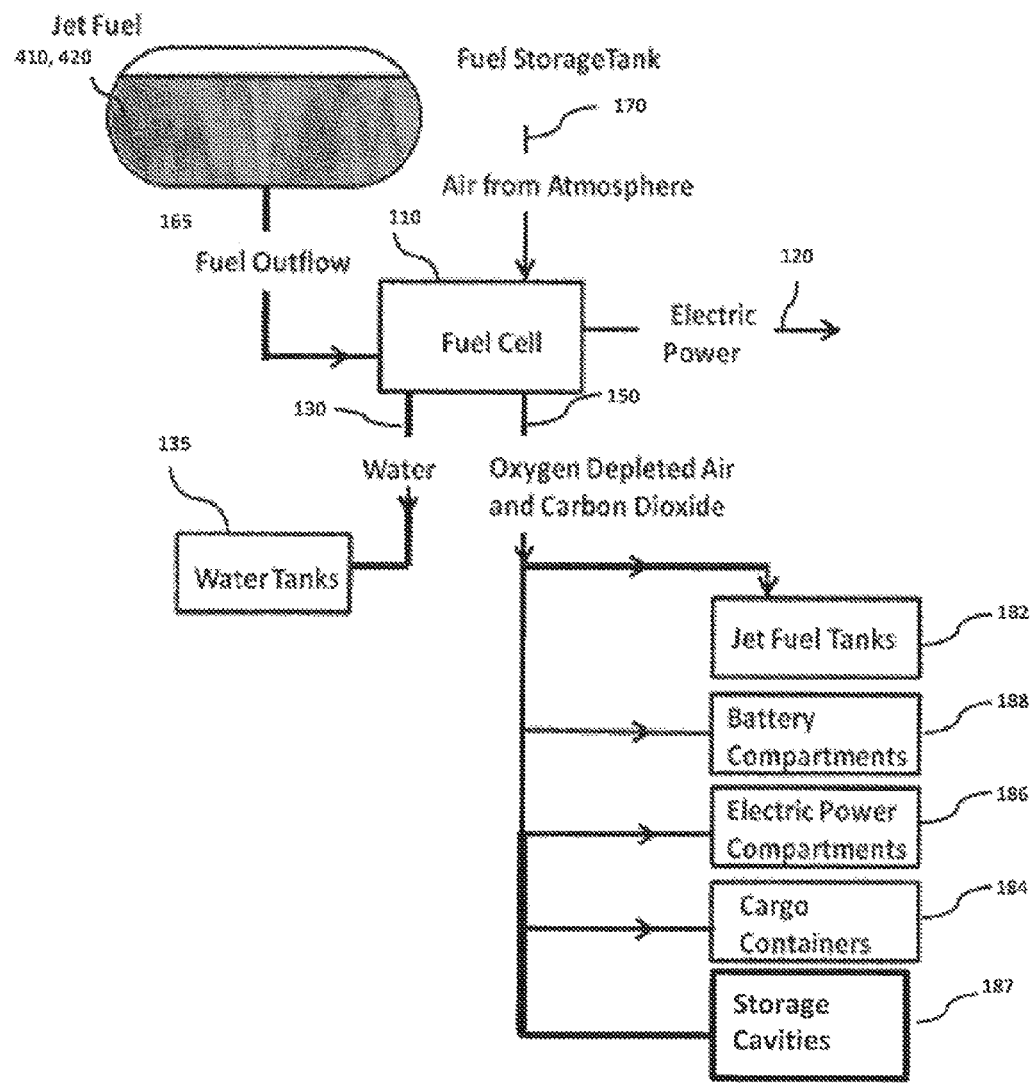
FIG. 4 is a flow diagram illustrating a fuel cell configuration using a non-cryogenic hydrocarbon fuel (e.g. jet fuel) to generate and further apply inert gas.

FIG. 4 illustrates yet another variation of the fuel cell configuration 100, but using a non-cryogenic hydrocarbon 410 as the fuel source 160. The hydrocarbon may be jet fuel 420, compressed propane, or butane. The process is essentially the same as described in FIG. 2, but with the vaporization loops eliminated. This configuration can apply to military and commercial transports, business jets, unmanned aerial vehicles, and other applications besides aircraft, where fuel cells are used for electric power generation.

Figure 5:
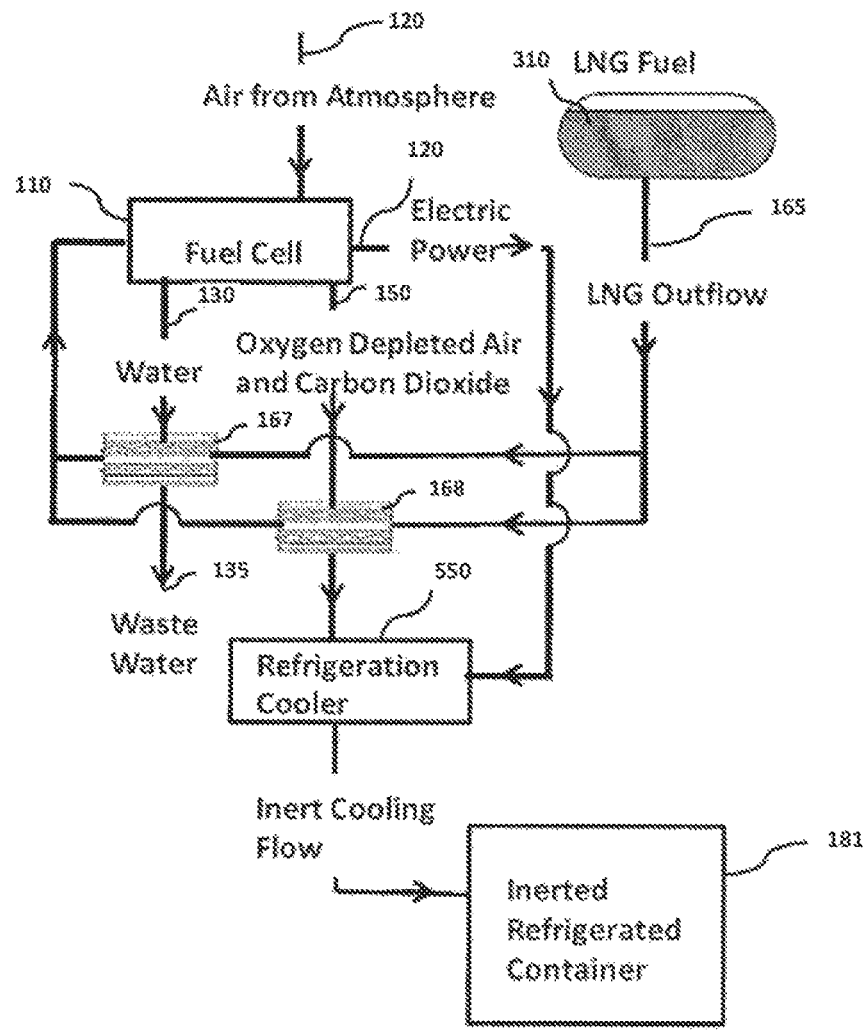
FIG. 5 is a flow diagram illustrating a fuel cell configuration using liquefied natural gas to generate, cool, and apply inert gas to create a refrigerated container.

FIG. 5 illustrates an application of the fuel cell configuration 100, wherein LNG is used as a fuel source, and inert gas is generated, cooled, and applied to create a refrigerated container 181. The process is similar to the method described in FIG. 3. However, after the inert gas flow 150 vaporizes the LNG fuel 310 through the heat exchanger 168, the gas is cooled in a refrigeration cooler 550. The refrigeration cooler 550 is powered by electricity 120 generated from the fuel cell. Once cooled, the inert gas 150 is received by a refrigerated container 181, which becomes inerted and can aid in preservation 194 and fumigation 193, food or beverage preparation 196, or other refrigeration purposes 195. This configuration could further be applied to static storage units, transportable containers, or rail cars or truck trailers.

Figure 6:
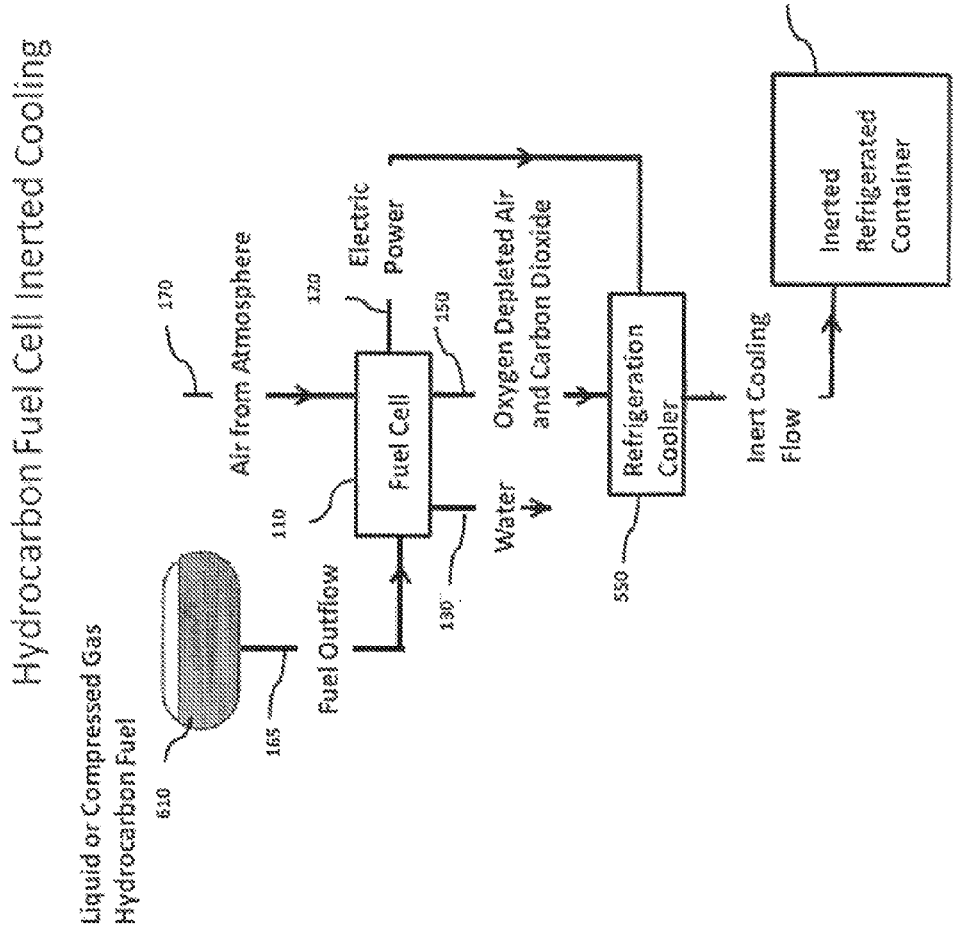
FIG. 6 is a flow diagram illustrating a fuel cell configuration using hydrocarbon fuel to generate, cool, and apply inert gas to create a refrigerated container.

FIG. 6 describes the same refrigeration concept as FIG. 5, wherein a hydrocarbon fuel source is used instead of LNG. The fuel source, for example, may be liquid or compressed gas 610. Again, the process is similar to that described in FIG. 5, but without the heat exchanger and vaporization steps.

Figure 7:
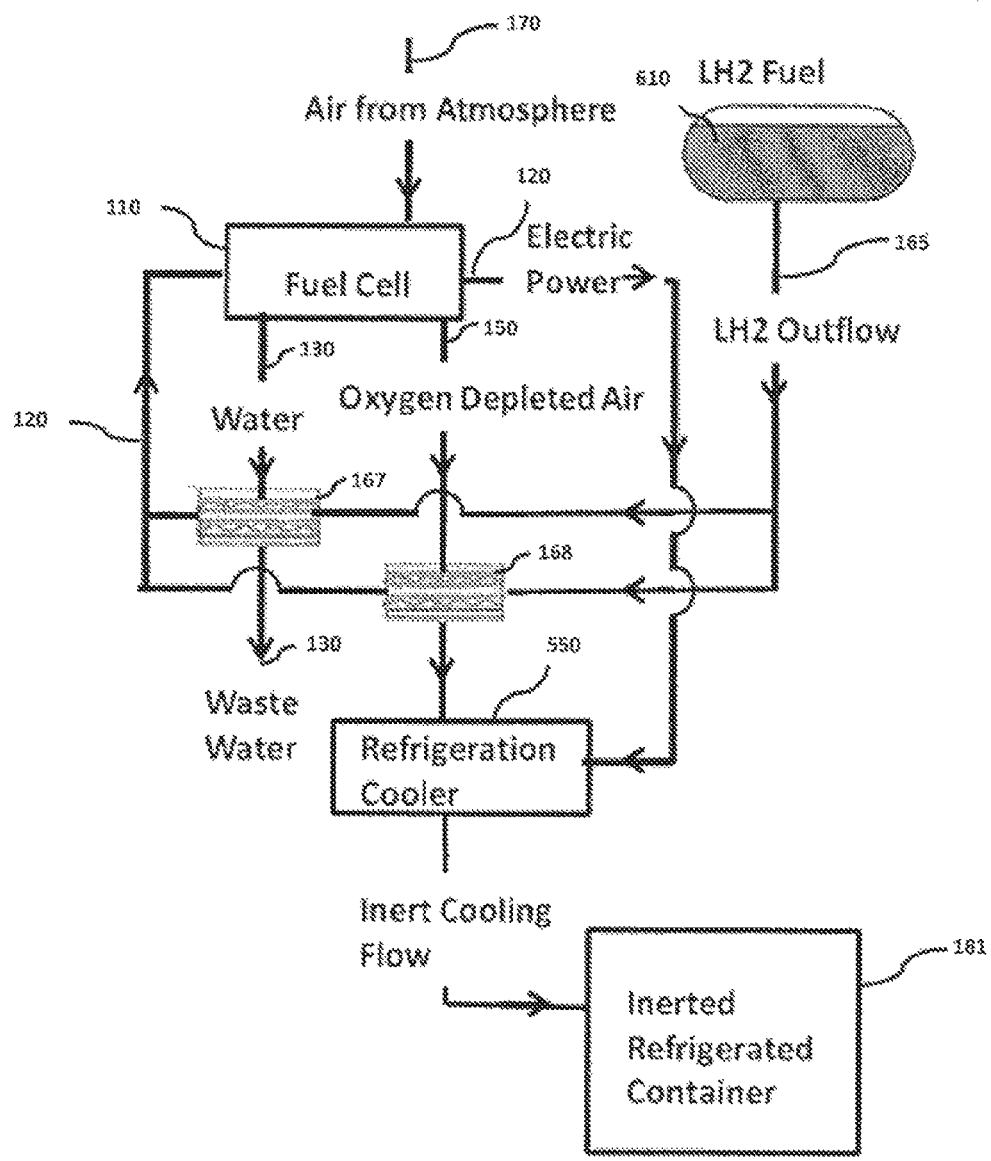
FIG. 7 is a flow diagram illustrating a fuel cell configuration using liquid hydrogen to generate and cool inert gas to create a refrigerated container.

Likewise, the system illustrated in FIG. 7 is essentially the same as FIG. 5, but with liquid hydrogen 610 used as the fuel source. Since pure hydrogen is used, carbon dioxide will not be present as a fuel cell waste product. Additionally, compressed hydrogen may be used in place of liquid hydrogen, and the vaporization loops 167, 168 are removed.

The various embodiments described above can be combined to provide further embodiments, and modified to achieve the advantages set forth. In general, the terms used should not be construed to limit the invention to the specific embodiments disclosed, but should be construed to include all fuel cell configurations in accordance with the claims.

What is claimed:

1. A fuel cell configuration 200 comprising:
   a dual purpose fuel cell 110 configured to generate electricity 120 and inert gas 150;
   a water tank 135 configured to receive a water outflow 130 produced by the fuel cell 110;
   a fuel tank 180 configured to receive the generated inert gas 150;
   a hydrogen fuel source 160 configured to ionize within the fuel cell and provide electrons to generate electricity; and
   a heat exchanger 220 configured to vaporize liquefied natural gas 310 for ionization in the fuel cell.

2. The fuel cell configuration in claim 1, wherein the fuel cell 110 further comprises:
   an oxygen source 170 composed of oxygen and other gases, configured to interact with the hydrogen fuel source 160, to produce the water outflow 130 and generate the inert gas 150.

3. The fuel cell configuration in claim 2, wherein the liquefied natural gas 310 is vaporized by the heat exchanger 220 to optimize ionization in the fuel cell 110.

4. The fuel cell configuration in claim 3, wherein the heat exchanger 220 obtains heat from the water outflow 130 of the fuel cell 110.

5. The fuel cell configuration in claim 3, wherein the heat exchanger 220 obtains heat from the outflows of inert gas 150, generated from the fuel cell 110.

6. The fuel cell configuration in claim 2, wherein the generated electricity 120 is delivered to an electric power storage unit 125.

7. The fuel cell configuration in claim 2, wherein the oxygen source 170 is atmospheric air.

8. The fuel cell configuration in claim 7, wherein the oxygen source 170 passes through an air compressor 210 to optimize the oxygen source 170 prior to a reaction from the fuel cell.

9. The fuel cell configuration in claim 1, wherein the fuel tank 180 comprises at least one of the following:
   a refrigeration container 181;
   a cargo container 184;
   an electric compartment 186;
   a storage cavity 187; and
   a battery compartment 188.

10. The fuel cell configuration in claim 9, further comprising a refrigeration cooler 550 using electricity 120 generated from the fuel cell 110 to cool the outflow of inert gas 150.

11. The fuel cell configuration in claim 1, further comprising a subsystem configured to apply the generated inert gas for at least one of the following:
    fire prevention 191;
    fire suppression 192;
    fumigation 193;
    preservation of perishables 194;
    refrigeration 195;
    food or beverage preparation 196; and
    prevention of oxidation reactions 197.

12. A method to generate inert gas using a fuel cell mechanism 100, comprising:
    operating a fuel cell 110 to generate electricity 120;
    generating oxygen-free inert gases 150 as fuel cell operation byproducts; and
    applying the oxygen-free inert gases 150 to inert a gas tank 180; and
    wherein the inert gases 150 are cooled by a refrigeration cooler 550, then applied to create a refrigeration container 181.

13. The method in claim 12, wherein the fuel cell generates electricity through a method comprising:
    configuring a hydrogen fuel source 160 to ionize within the fuel cell 165, and generate electricity 120 for an electric storage unit 125; and
    configuring an oxygen source comprised of oxygen and other gases 170, to interact with the hydrogen fuel source to produce a water outflow 130 and generate the inert gases 150.

14. The method in claim 13, wherein the hydrogen fuel source 160 used by the fuel cell 110 comprises at least one of the following:
    liquefied natural gas 310;
    liquefied or compressed hydrogen 610; and
    a non-cryogenic hydrocarbon 410.

15. The method in claim 12, wherein the inert gases 150 are applied to inert fuel tanks 180 comprised of at least one of the following:
    a refrigeration container 181;
    a fuel tank 182;
    a cargo container 184;
    an electrical compartment 186;
    a storage cavity 187; and
    a battery compartment 188.

16. The method in claim 15, further applying the inert gases 150 to serve as fire prevention 191 and fire suppression 192.

17. The method in claim 15, further applying the inert gases 150 to fumigate 193 cargo containers 184, electrical compartments 186, or other storage cavities 187.

18. The method of claim 15, further applying the inert gases 150 to preserve perishables 194.

19. The method of claim 15, further applying the inert gases 150 for food beverage preparation 196.

20. The method in claim 15, further applying the inert gases 150 to minimize risks of oxidation in fuel tanks 180.

* * * * *